United States Patent [19]

Esterowitz et al.

[11] 4,347,485
[45] Aug. 31, 1982

[54] EXCIMER-PUMPED BLUE-GREEN LASER

[75] Inventors: Leon Esterowitz, Annandale; Roger E. Allen, Alexandria, both of Va.; Melvin R. Kruer, Oxon Hill; Filbert J. Bartoli, Upper Marlboro, both of Md.

[73] Assignee: The United States of America as represented by the Secretary of the Navy, Washington, D.C.

[21] Appl. No.: 41,969

[22] Filed: May 23, 1979

Related U.S. Application Data

[63] Continuation-in-part of Ser. No. 868,360, Jan. 10, 1978, abandoned.

[51] Int. Cl.$^3$ .............................................. H01S 3/14
[52] U.S. Cl. ..................................................... 372/42
[58] Field of Search ....................... 331/94.5 E, 94.5 F

[56] References Cited

U.S. PATENT DOCUMENTS 4,167,712  9/1979  Esterowitz et al. ............ 331/94.5 P

FOREIGN PATENT DOCUMENTS 46-52254  7/1971  Japan .

OTHER PUBLICATIONS

"Blue Light Emission by a Pr:LiYF$_4$− Laser Operated at Room Temperature", by Esterowitz et al., *Jour. of Appl. Phys.*, vol. 48, No. 2, pp. 650–652, Feb. 1977.

*Primary Examiner*—William L. Sikes
*Assistant Examiner*—Leon Scott, Jr.
*Attorney, Agent, or Firm*—R. S. Sciascia; William T. Ellis; Melvin L. Crane

[57] ABSTRACT

A method of achieving inversion in solid-state rare-earth materials for blue-green laser operation. A XeF excimer laser is used to pump a matching transition in divalent ytterbium in a host material. The host material is co-doped with a trivalent ion such as praseodymium ($Pr^{3+}$) so that energy transfer to the trivalent ion will take place. Laser action is then from the $Pr^{3+}$ ion. Alternative matching absorption transitions also occur in the trivalent rare-earth ions of Tb, Dy, Ho, and Nd.

8 Claims, 2 Drawing Figures

EXCIMER-PUMPED BLUE-GREEN LASER

CROSS REFERENCE TO RELATED APPLICATION

This application is a continuation-in-part of application Ser. No. 868,360 filed Jan. 10, 1978.

BACKGROUND OF THE INVENTION

This invention is directed to a solid-state laser and more particularly to a XeF-excited laser crystal which is co-doped with divalent ytterbium and a trivalent rare-earth ion.

It is well known in the art that laser cavity systems consist of three main components, a lasing medium, pump radiation, and reflecting surfaces. Laser systems may be chemical, solid state or gaseous. They may be optically pumped, electronically excited, or chemically excited. They may be operated at room temperature or at nitrogen temperature. They may operate inside or outside the visible spectral region. They may be high power or low power. Such laser systems have been developed using a variety of elements, compounds, gases or fluids. All laser systems have one thing in common, they emit coherent radiation. Coherent radiation refers to the organization of energy waves emitted by stimulated atoms so that the waves travel in the same direction, at the same frequency and in step with the stimulating radiation.

Heretofore laser emission at different wave lengths has been reported in an article, "Stimulated Emission From PrCl$_3$", by K. R. German, et al., in *Applied Physics Letters*, Vol. 22, No. 3, Feb. 1, 1973, pp. 87–89. This work involved a tunable pulsed dye laser pumped by a nitrogen UV laser and a crystal of PrCl$_3$. It has been determined that dye lasers have poor operational life in the excitation wavelengths required and the incoherent sources have poor efficiency. Thus, it is desirous to provide a better arrangement of elements for achieving inversion in solid-state rare-earth materials for blue-green laser operation.

SUMMARY OF THE INVENTION

This laser system employs an XeF excimer laser pumped by a self-sustained Blumleim electric discharge. The XeF laser pumps a matching transition in divalent ytterbium which has an absorption band between 350 and 360 nm depending on the host material. The host material is then co-doped with a trivalent ion such as praseodymium (Pr$^{3+}$) so that energy transfer to the trivalent ion will take place. Laser action is from the Pr$^{3+}$ ion which lases at 480–490 nm. Excimer-pumped solid-state rare-earth blue-green lasers have better efficiency and operational life than prior art dye-pumped laser systems.

DETAILED DESCRIPTION

Figure 2:
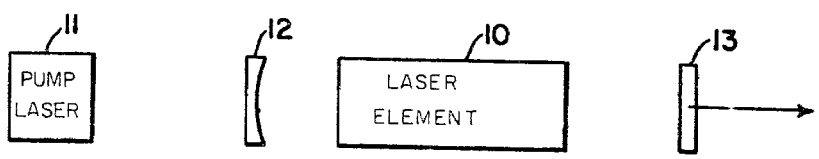
FIG. 2 is a laser system.

A room temperature blue-green laser is developed here by co-doping a laser crystal with a divalent ytterbium (Yb$^{2+}$) sensitizer, for example, and a trivalent rare-earth activator ion such as praseodymium (Pr$^{3+}$). The optimum concentration of activator ion (Pr$^{3+}$) varies with host crystal as does that of the sensitizer Yb$^{2+}$. Since Yb$^{2+}$ has a large absorption cross-section, the sensitizer concentration may be two to three orders of magnitude lower than that of the activator ions. Activator concentration varies from 0.05% to 3% depending on the host material. Alternative sensitizer ions include the trivalent rare-earth ions of Terbium (Tb), Dysprosium (Dy), Holmium (Ho) and Neodymium (Nd), whose absorption transitions provide a good match to the excimer laser pump. The concentration of these ions ranges from 0.1 to 40%. Moreover, alernative activator ions which have transitions suitable for lasing in the blue-green spectral region include Tb, Dy, Ho, Erbium (Er) and Thulium (Tm).

A co-doped laser as set forth above may be made by any suitable crystal growing method by which the trivalent rare-earth activator ions and the divalent sensitizer ions may be uniformly dispersed throughout the crystal during the growth process. Such crystals include LiYF$_4$, LaF$_3$, YVO$_4$, YAsO$_4$, CaF$_2$, BaF$_2$, SrF$_2$, YF$_3$KY$_3$F$_{10}$, YPO$_4$, YALD, SOAP, GdVO$_4$, LuPO$_4$, LuAsO$_4$, GaF$_3$ and LaF$_3$. It has been determined that with a host material of LiYF$_4$ the concentration of trivalent rare-earth ions of praseodymium (Pr$^{3+}$) necessary for laser action is between the range of about 0.05% and about 0.5% by weight and the concentration of ytterbium ions is from about 0.0001% to about 0.01% by weight.

Preparation of LiYF$_4$ crystals co-doped with trivalent praseodymium and divalent ytterbium at the desired concentration levels can be accomplished via current crystal growth practices. Concentration of up to 2% Pr$^{3+}$ and up to 0.5% Yb$^{2+}$ are straightforward. The first step is to prepare and treat some LiF, some YF$_3$, some PrF$_3$ and YbF$_3$ with hydrogen fluoride. Hydrofluorination (heating in pure HF) removes oxidic contaminants. The YbF$_3$ is then heated in a stream of palladium-diffused hydrogen, which converts YbF$_3$ into YbF$_2$. The LiF, YF$_3$, PrF$_3$ and YbF$_2$ are brought to a melt under titanium-gettered argon and the crystal is grown. No valence changes should take place, since the atmosphere is completely neutral. For the small number of Yb$^{2+}$ ions (compared to the Pr$^{3+}$ concentration) compensation may proceed by loss of a fluoride ion somewhere in the crystal. (Chemical attack of a crucible is one easy way for this to happen, even when one wishes not to have it so.) Another way is to oxidize a number of Pr$^{3+}$ ions to Pr$^{4+}$, the number oxidized to be precisely equal to the number of Yb$^{2+}$ ions put into the lattice. Electrical compensation will be spontaneous since both Yb$^{2+}$ and Pr$^{4+}$ produce less lattice distortion, when substituted for Y$^{3+}$, than does Pr$^{3+}$. For both cases above, during crystal growth, the melt takes care of counting the electrons and distributing them into a minimum-energy configuration.

Since one may wish to avoid having Pr$^{4+}$ in the crystal, another approach is possible. Hydrofluorinated ThF$_4$, equal in concentration to the YbF$_2$, is added to the LiF, YF$_3$, PrF$_3$ and YbF$_2$, as before the crystal is grown from the melt. Deliberate addition of this tetravalent dopant will yield a compensated crystal with not much more lattice distortion than one would get with simple praseodymimum doping. In this way all the praseodymium is maintained in the trivalent state.

Figure 1:
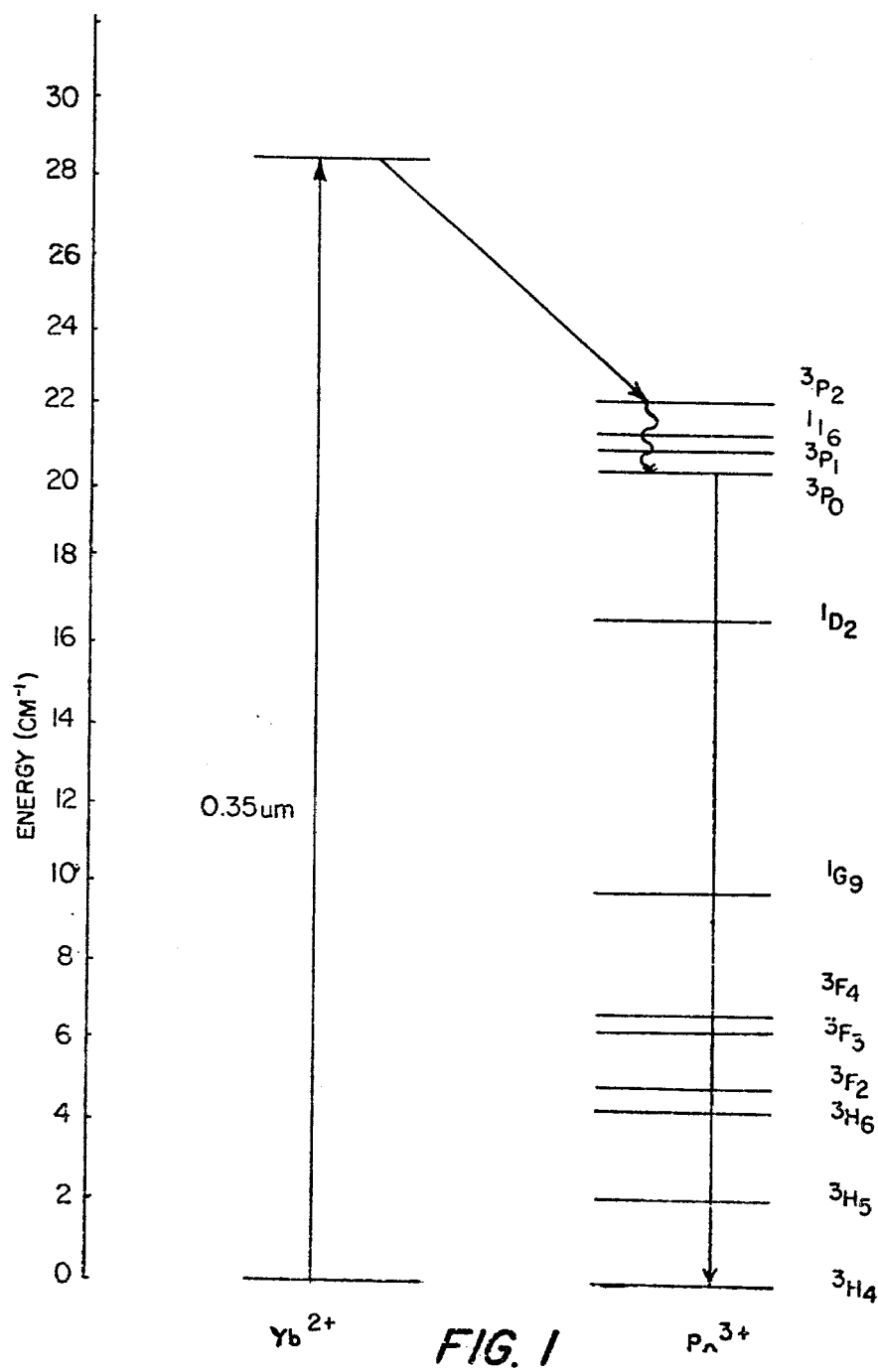
FIG. 1 is a diagram of the energy levels.

The co-doped laser crystal is pumped by a XeF excimer laser operating at 352 nm. The 352 nm radiation is absorbed by the Yb$^{2+}$ ions which have an absorption energy level between 350 and 360 nm, depending on the host material, matching that of the excimer laser wavelength. FIG. 1 illustrates how the energy is transferred from the $Yb^{2+}$ energy level to the upper energy levels of the $Pr^{3+}$ ions which cascade to the $^3P_o$ level. The transition between the $^3P_o$ and $^3H_4$ level of the $Pr^{3+}$ ions gives rise to laser radiation in the blue-green spectral region. For example the laser wavelength for $Pr^{3+}$ in $LiYF_4$ is 0.479 μm.

The sensitizer element selected for use in a specific rare-earth host laser crystal is an element whose absorption line level in the host crystal at which absorption takes place match the region of the pump wavelength.

In operation, a laser element 10 made in accordance with the teaching above is excited or pumped by a XeF excimer laser 11 operation at 352 nm. The output radiation from the XeF laser is directed through a mirror 12 axially aligned with the laser element which passes radiation of 352 nm and is fully reflective at 479 nm. A partially reflective mirror 13 passes an output beam of 479 nm and completes the laser cavity with mirror 12. The mirrors may be aligned by use of a separate laser or any other method known to the art.

Excimer-pumped solid-state rare-earth blue-green lasers have a better efficiency and operational life than any other known laser system operating in the blue-green frequency range. The above-described system is smaller in size, less costly and of less weight than any known laser system operative in the blue-green frequency range. Hence it is a highly promising choice for a laser system capable of meeting the stringent operational characteristics required for underwater applications.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A solid-state laser element for obtaining blue-green radiation emission in a laser:
   a rare-earth host laser crystal, said host laser crystal including therein uniformly dispersed trivalent rare-earth activator ions, and
   uniformly dispersed divalent sensitizer ions.

2. A solid-state laser element for blue-green operation as claimed in claim 1 in which:
   said sensitizer ions are divalent ytterbium ($Yb^{2+}$).

3. A solid-state laser element for blue-green operation in a laser system as claimed in claim 2 in which:
   said trivalent rare-earth activator ions are $Pr^{3+}$.

4. A solid-state laser element for blue-green operation in a laser system as claimed in claim 3 in which:
   said host crystal is $LiYF_4$.

5. An efficient blue-green laser which comprises:
   a resonant cavity including means for passing radiation of a desired wavelength,
   a host crystal of $LiYF_4$ disposed within said resonant cavity;
   rare-earth activator ions of trivalent praseodymium uniformly dispersed within said host crystal;
   sensitizer ions of divalent ytterbium uniformly dispersed within said host crystal and having an absorption level; and
   an excimer pump laser for pumping said host crystal, said excimer laser having an output energy which is a good match with the absorption energy level of said ytterbium sensitizer ions,
   said activator ions being raised from their ground level to an excited state by excited sensitizer ions and the activator ions providing lasing radiation upon de-excitation.

6. An efficient blue-green laser as claimed in claim 5, wherein:
   said excimer pump laser has an output of 352 nm.

7. An efficient blue-green laser as claimed in claim 6, wherein:
   the concentration of said praseodymium ions is from about 0.05% to about 0.5% by weight, and
   the concentration of said ytterbium ions is from about 0.0001% to about 0.01% by weight.

8. An efficient blue-green laser which comprises:
   a resonant cavity including means for passing radiation of a desired wavelength;
   a host crystal of $LiYF_4$ disposed within said resonant cavity;
   rare-earth activator ions of trivalent praseodymium having a concentration of from about 0.05% to about 0.5% by weight uniformly dispersed within said host crystal;
   sensitizer ions of divalent ytterbium with an absorption energy level having a concentration of from about 0.0001% to about 0.01% by weight uniformly dispersed within said host crystal;
   an excimer pump laser having an output of about 352 nm for pumping said host crystal, said output of about 352 nm being a good match with the absorption energy level of said ytterbium sensitizer ions;
   said activator ions being capable of being raised from their ground level to an excited state by excited sensitizer ions and the activator ions providing lasing radiation upon de-excitation.

* * * * *